(12) United States Patent
Murray et al.

(10) Patent No.: US 12,359,126 B2
(45) Date of Patent: Jul. 15, 2025

(54) HYDROMULCH COMPOSITION AND METHOD OF USE THEREOF

(71) Applicants: George C. Murray, Lebanon, IN (US); Rhett K. Kerby, Shallowater, TX (US); Landon D. Kerby, Levelland, TX (US); Gunner S. Kerby, Shallowater, TX (US); KERTEC, LLC, Shallowater, TX (US)

(72) Inventors: George C. Murray, Lebanon, IN (US); Rhett K. Kerby, Shallowater, TX (US); Landon D. Kerby, Levelland, TX (US); Gunner S. Kerby, Shallowater, TX (US)

(73) Assignee: KoTon, LLC, Shallowater, TX (US)

( * ) Notice: Subject to any disclaimer, the term of this patent is extended or adjusted under 35 U.S.C. 154(b) by 390 days.

(21) Appl. No.: 17/912,439

(22) PCT Filed: Mar. 17, 2021

(86) PCT No.: PCT/US2021/022841
§ 371 (c)(1),
(2) Date: Sep. 16, 2022

(87) PCT Pub. No.: WO2021/188730
PCT Pub. Date: Sep. 23, 2021

(65) Prior Publication Data
US 2023/0134142 A1 May 4, 2023

Related U.S. Application Data

(60) Provisional application No. 62/990,657, filed on Mar. 17, 2020.

(51) Int. Cl.
*C09K 17/52* (2006.01)
*A01G 13/35* (2025.01)
(Continued)

(52) U.S. Cl.
CPC .............. *C09K 17/52* (2013.01); *A01G 13/35* (2025.01); *B09C 1/08* (2013.01); *E02D 17/20* (2013.01); *B09C 2101/00* (2013.01)

(58) Field of Classification Search
CPC .... C09K 17/52; A01G 13/02; A01G 13/0262; B09C 1/08; B09C 2102/00; E02D 17/20
See application file for complete search history.

(56) References Cited

U.S. PATENT DOCUMENTS

| | | | | |
|---|---|---|---|---|
| 7,788,847 B1 * | 9/2010 | Holt | ....................... | C09K 17/52 47/9 |
| 7,900,394 B2 * | 3/2011 | Ellis | ....................... | C09K 17/52 47/9 |

(Continued)

*Primary Examiner* — Kyle Armstrong
(74) *Attorney, Agent, or Firm* — Tyler B. Droste; Gutwein Law

(57) ABSTRACT

A hydromulch composition compromising an oil-extruded cottonseed meal processed from a non-delinted cottonseed. The oil-extruded fuzzy cottonseed meal can optionally be combined with one or more super absorbent polymers, such as polyaspartate and polyacrylate polymers and other additives. The hydromulch composition can additionally include one or more microorganisms including but not limited to bacteria and mycorrhizae configured to provide symbiotic relationship with treated soil and plants to increase water and nutrient uptake in the treated plants or soil. The hydromulch composition can further be combined with a dispersant, such as water to make slurry for spray on application to a desired treatment surface.

16 Claims, 5 Drawing Sheets

(51) Int. Cl.
    *B09C 1/08*           (2006.01)
    *E02D 17/20*        (2006.01)

(56) References Cited

U.S. PATENT DOCUMENTS

| | | | |
|---|---|---|---|
| 8,978,292 B1* | 3/2015 | Holt | A01G 13/0262 47/9 |
| 2002/0018842 A1* | 2/2002 | Dunlow | A23L 25/30 426/630 |
| 2006/0216397 A1* | 9/2006 | Kerkman | A23K 40/20 426/635 |

* cited by examiner

HYDROMULCH COMPOSITION AND METHOD OF USE THEREOF

CROSS-REFERENCE TO RELATED APPLICATION

This Patent Application claims priority to U.S. Provisional Application 62/990,657 filed Mar. 17, 2020, the disclosure of which is considered part of the disclosure of this application and is hereby incorporated by reference in its entirety.

FIELD OF THE INVENTION

This invention relates generally to a method and composition for erosion control and land reclamation. In one aspect, this invention relates to a hydromulch composition including a meal component from non-delinted cottonseed, which may be combined with a polymer, or other additives to aid in water retention, and/or other forms of mulch.

BACKGROUND

The present invention pertains generally to a product for ground placement as a cover to protect water runoff quality and promote vegetation growth when desired for areas of great erosion threat or land reclamation efforts.

Land reclamation is a restoration of the productivity or use to lands that have been degraded by human activities. This degradation usually falls into several categories: oil and gas explorations and installations, solar and wind energy installations, and commercial and real estate development of land. In all of the scenarios, once the land is disturbed throughout the various construction processes, it is necessary to restore that land—and specifically the surface of that land—to prevent serious erosion to the property and allow for the eventual return of native flora and fauna. At construction sites for commercial buildings, homes, roadways, mines, etc., substantial damage is imparted to ground surfaces. Destruction of natural ground cover is commonplace by reason of construction equipment disturbing the ground surface. For a period of time, during and after construction efforts, considerable erosion may occur. Construction or work sites may additionally be subject to contamination which when not confined may migrate to and adversely affect ground surfaces and waterways adjacent the construction site.

The foregoing problems have been recognized by the federal government resulting in legislation that will require all construction projects, one acre in size or larger, to file an erosion control plan. Further, particulate flow from such sites toward waterways will be severely restricted under such legislation. Additional concern has been directed toward controlling erosion and contamination at locations along freeways where contamination by hydrocarbons from vehicle oil, fuel and exhaust occurs which may eventually enter waterways.

There are varying different compositions that have been used to attempt to reclaim or treat the affect land. One composition that has been routinely used are hydromulches. The USDA-Natural Resources Conservation Service (NRCS) defines hydromulch as a mixture of fiber mulch (with tackifying agents) to prevent soil erosion. Hydromulch is usually applied through a specialized piece of hydromulching equipment that comes equipped with a large tank (1000-3000 gallons typically) along with a special pump and a continuous agitation system. The pump forces the slurry through either a discharge nozzle mounted on the top of the tank or a nozzle on the end of the hose. A minimum surface coverage of 70% is required, and the surface cover needs to remain until the seed that was applied prior to the hydromulching (or native flora already present) has a chance to become established, therefore stabilizing the soil from erosion. In some cases, this might require the mulch to remain for an entire growing season.

Many different kinds of mulch are commonly used: wood fibers, cellulose (known as paper mulch), coconut-fiber, or straw. Depending on the degree of slope for the project, various amounts of tackifier additives are generally used. Various binding systems are proposed in the prior art, including U.S. Pat. Nos. 3,292,307, 3,482,353, 3,696,559, and Re. Pat. No. 28,950. Further, the prior art has described mulch systems produced from cellulosic fibers, such as U.S. Pat. Nos. 3,017,720 and 3,165,862. These patents describe a mulch which comprises straw or other similar material which is adhered together using asphalt as an adhesive. While many of the compositions described in the prior art have been successful in producing mulch compositions satisfactory to accomplish a re-seeding of soil, such compositions, as a practical matter, have not been adapted to spraying.

Current hydromulch materials have a high carbon to nitrogen ratio. This means that in the process of degradation, the products will need to take up nitrogen from the soil—this can inhibit germination and establishment as the mulch itself will compete with the vegetation. In addition to this, all of the materials currently used need a great deal of tackifiers to become sticky as they lack any natural proteins or molecules that would assist on this front. Finally, some mulches can be prohibitively expensive—possibly owing to the logistics needed to ship them from one location to the next in their processing, along with the expense of the processing into a hydromulch.

There exists a need for a hydromulch composition that is easy to produce, can aid in water retention, and not deprive the treated land of the necessary nitrogen to grow vegetation.

BRIEF SUMMARY OF THE INVENTION

In one aspect, this disclosure is related to compositions of hydromulch product including an oil-extruded fuzzy cottonseed meal produced from non-delinted cottonseed and the production and manufacturing thereof.

In another aspect, this disclosure is related to the production and manufacturing compositions of hydromulch products that contain oil-extruded fuzzy cottonseed meal from non-delinted cottonseed.

In yet another aspect the present disclosure is related to a method for providing erosion control or land remediation by first providing the hydromulch composition comprising 70-100% by weight of a fuzzy cottonseed meal derived from oil-extruded non-delinted cottonseed. The hydromulch composition may then optionally be homogenized with one or more other components or additives. The one or more additives can include one or more\superabsorbent polymer (SAP), one or more carboxylated polymers, biological components, pigment, clay product, cement product, bird repellent agent, thickening agents, tackifier agent and/or a cross-linking agent. The hydromulch composition may then be mixed with a liquid composition at a ratio between 1:3 and 3:1 pounds of hydromulch composition per gallon of liquid composition to form a hydromulch composition slurry. The hydromulch composition slurry may then be applied to a desired treatment surface, such as the ground or target soil surface.

In yet another aspect, the present disclosure relates to a hydromulch composition comprising a fuzzy cottonseed meal derived from non-delinted cottonseed, wherein the oil content of the fuzzy cottonseed meal component is less than 15% by weight and the lint-exposed component of the resulting fuzzy cottonseed meal product is between 20-30% by weight of the cottonseed meal product. The hydro mulch composition can include fuzzy cottonseed meal product between 70-99% by weight of the hydromulch composition. Optionally, the hydromulch composition can further include one or more additional additives such as between about 0.1%-0.5% by weight of a superabsorbent polymer (SAP), between about 0.1%-0.5% by weight of a carboxylated polymer, between about 0.01%-0.5% by weight of a biological component, between about 0.01%-0.5% by weight of a pigment, between about 0.01%-0.5% by weight of a clay product, between about 0.01%-0.5% by weight of a cement product, between about 0.01%-0.5% by weight of a bird repellent agent, between about 0.01%-0.5% by weight of a thickening agents, between about 0.01%-0.5% by weight of a tackifier agent; or between about 0.002-0.5% by weight of a cross-linking agent.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

FIGURES

DETAILED DESCRIPTION OF THE INVENTION

Figure 1A:
FIG. 1A is an image of an exemplary embodiment of the hydromulch composition of the present disclosure immediately after application to the ground.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. Similarly, coupled can refer to a two member or elements being in communicatively coupled, wherein the two elements may be electronically, through various means, or other medium and methods.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Reclaimed cotton byproducts offer various benefits over the traditional wood fibers and others used in traditional hydromulch compositions. These cotton byproducts, however, can often lack proteins found which can be found in raw cottonseed meal using oil-extruded non-delinted cottonseed as a base. The composition of the present disclosure provides for an oil-extruded non-delinted cottonseed meal as the base component in an exemplary embodiment of the present disclosure.

Unlike other traditional hydromulch compositions that are compacted and baled, which make them difficult to break down in a hydromulching machine, the hydromulch composition of the present disclosure can come non-compacted in bags that can be easily poured into the openings of the hydromulching machines. Some exemplary embodiments of the hydromulch composition of the present invention can include oil-extruded fuzzy cottonseed meal produced from a non-delinted cottonseed product, as well as carboxylated polymers to help absorb water, and increase the nutrient availability for the germination seed or establishing flora. In addition to this, some exemplary hydromulch compositions could contain biological additions to increase the establishment of the seed or establishing flora.

One exemplary embodiment of the hydromulch composition of the present disclosure can include about 80-100% parts by weight of a seed meal component. In one exemplary embodiment of the present disclosure, the seed meal component can include a cottonseed meal, such as an oil-extruded fuzzy cottonseed meal. The hydromulch composition can additionally include one or more of the following additives/components: between about 0.1-0.5% superabsorbent polymer (SAP), about 0.1-0.5% carboxylated polymer which can be used for greater nutrient uptake, and about 0.01-0.5% by weight biological components, including but not limited to bacterial and/or mycorrhizal additives. Furthermore, an exemplary embodiment of the hydromulch composition may also include about 0.01-0.5% pigment, about 0.01-0.5% clay product, such as bentonite, about 0.01-0.5% cement product, such as Portland cement, about 0.01-0.5% bird repellent agent, about 0.01-0.5% thickening agents, such as guar and/or xanthum gum, and/or about 0.01-0.5% tackifier agent. In some exemplary embodiments, the hydromulch composition can further include about 0.002-0.5% by weight of a cross-linking agent, including but not limited to sodium tetraborate, wherein the crosslinking agent can allow for crosslinking a thickening agent, such as guar or xanthum gum.

In one exemplary the seed meal component is a fuzzy cottonseed meal that can be derived from an oil-extruded non-delinted cottonseed product. Typically, cottonseed is delinted (whereby the fuzz is removed from the seed coat) before the cottonseed oil is extruded. By obtaining non-delinted cottonseed (S101), all of the proteins and starches in the seed coat can be preserved in the fuzzy cottonseed meal product. The fuzzy cottonseed meal can then be further processed (S103) using a press, such as a screw press or any other suitable method, wherein all or the majority of the oil can be separated or extracted from the fuzzy cottonseed meal. As the meal exits the screw press the meal can take the form of patties. The patties or solid fuzzy cottonseed meal blocks can be broken or pulverized using any suitable means, including but not limited to a hammermill (S105). The breaking/pulverizing step is responsible for exposing the fibrous lint attached to the cottonseed. This resulting type of cottonseed meal is naturally tacky due to the proteins and starches preserved in the processing of the fuzzy cottonseed meal product. Traditional cottonseed meal derived from delinted cottonseed has the appearance and consistency of coffee seed grounds and is therefore not suitable as a hydromulch product. The processed fuzzy cottonseed meal of the present disclosure can be used as a seed meal component for an exemplary embodiment of a hydromulch composition of the present disclosure (S107). In some exemplary embodiments, the resulting processed fuzzy cottonseed meal can be provided as a hydromulch composition or further combined and homogenized with additional components to form a hydromulch composition.

In some exemplary embodiments of hydromulch composition of the present disclosure, a superabsorbent polymer source for water absorption may by for example, but by no means limited to: polyacrylates, polyacrylamides, and/or copolymerized corn starch. Similarly, the carboxylated polymer source for nutrient uptake may be for example, but by no means limited to carboxylated polymers containing an amine group (such as polyaspartate, polyacrylamides, polyglutamate, polyanhydroaspartic acid etc.), carboxylated polymers not containing an amine group (such as polyepoxysuccinic acid, etc.).

Some exemplary embodiments can further include one or more biological microorganisms including but not limited to bacterial and/or mycorrhizal additives. The biological additives can be configured to promote vegetation growth and nutrient/water uptake. The bacteria and mycorrhizae (endo- and ecto-mycorrhizae) can offer benefits to the establishing seed or flora. Mycorrhizae can form symbiotic relationships with the plants via attachment to the plant roots—increasing the uptake of water and nutrients into the plant. Bacteria can assist with nutrient availability, while also offering protection from certain diseases that may be present in the soil.

A clay product can be added to an exemplary embodiment of the composition to increase the lubricity of the slurry for increased flowability through a distributing machine's pump and plumbing equipment. In some exemplary embodiments, the clay product can be bentonite.

Similarly, a cement product, such as Portland cement can allow for the fuzzy cottonseed meal after it has dried to harden into a crust-like layer on the treated land surface. The crust-like layer can reduce the raindrop impact induced water and wind erosion. Additionally, a bird repelling agent can be included in the composition mixture to prevent the composition from being disturbed by birds and/or other animals. This component can be a commercially available chemical composition including but not limited to 9,10 anthraquinone or Methyl Anthranilate (MA), methyl 2-aminobenzoate or other similar chemical compositions.

Additional, thickening agents and tackifier agents can be included in the composition as well. One or more thickening agents can allow for uniform mixing of the oil-extruded fuzzy cottonseed meal in water aiding in flowability of the slurry through a spreader machine's pump and plumbing system. The thickening agents can include but are not limited to guar or xanthum gum. Similarly, the tackifier can aid in the oil-extruded fuzzy cottonseed meal's ability to bind to the treated land/soil surface. The adhesion to the surface is important to aid in preventing erosion of the soil. Tackifier agents can include, but are not limited to, terpene resins, other similar resins, and molasses.

In one exemplary embodiment, a hydromulch composition of the present disclosure can include regularly ginned, non-delinted cottonseed that can undergo oil extrusion via any suitable method such as a standard screw press. In some embodiments, the resulting meal can be in the form of a meal patty. The formed patties can then be broken by way of a breaking apparatus, such as a hammermill. The breaking apparatus can be responsible for exposing the fibrous lint attached to the cottonseed. The oil composition remaining in meal can fluctuate and have no bearing on the meal's function as hydromulch. Extruded oil can be captured independently from the meal and further processed or refined to be used for other purposes. Once oil-extruded fuzzy cottonseed meal is produced, then any additional components, including but not limited to, polyacrylates, polyaspartates, polyacrylamides, bacteria, mycorrhizae, pigments, bentonite, Portland cement, chemical bird repellents, thickening agents, and tackiers can be added into the mixture to create a homogeneous product that can be packaged into bags of various sizes—from about 5-lb bags to 2000-lb super sacks for application in the field. In some exemplary embodiments, the cottonseed meal can be supplied separately from the additional additives/components. A downstream use can supply any additional components that they may require to the fuzzy cottonseed meal component. The additional components are optional and can be added and homogenized with the cottonseed meal as desired by an end user. In some exemplary embodiments, the hydromulch composition can provide coverage to the surface of the ground or treatment area at a rate of between about 0.08 to about 0.13 pounds of hydromulch composition per square foot of treatment surface. In other exemplary embodiments, the amount of hydromulch utilized per square foot of coverage can be between 0.09 to about 0.12 pounds. Various coverage amounts can be achieved by combining the hydromulch composition with a liquid or other aqueous solutions, such as water, to allow for spray on applications and extensive coverage of the desired treatment surface.

In some other exemplary embodiments, a hydromulch composition of the present disclosure can use a hemp composition in place of or in addition to the seed meal component. A hydromulch composition of the present disclosure can include about 70%-99% parts by weight organic component, such as a hemp byproduct. The organic component can include a cottonseed meal, such as oil-extruded fuzzy cottonseed meal, a hemp product or byproduct or other organic components. Additionally, in some exemplary embodiments, the hemp product can include residual hemp fibers or hemps stalk residues. In some exemplary embodiments, the hydromulch composition can additionally include one or more of the following: about 0.1%-0.5% by weight superabsorbent polymer (SAP), about 0.1%-0.5% by weight carboxylated polymer which can be used for greater nutrient uptake, and about 0.01%-0.5% parts by weight biological components, including but not limited to bacterial and/or mycorrhizal additives. The composition may also include about 0.01%-0.5% by weight of pigment, about 0.01%-0.5% by weight of clay product, such as bentonite, about 0.01%-0.5% by weight of cement product, such as Portland cement, about 0.01%-0.5% by weight of bird repellent agent, about 0.01%-0.5% by weight of thickening agents, such as guar and/or xanthum gum, and/or about 0.01%-0.5% by weight of a tackifier agent.

In another exemplary embodiments, the hydromulch composition of the present disclosure can include about 70%-99% parts by weight seed meal component. In one exemplary embodiment of the present disclosure, the seed meal component can include a cottonseed meal, such as oil-extruded fuzzy cottonseed meal. The hydromulch composition can include one or more of the following: about 0.1%-0.5% by weight superabsorbent polymer (SAP), about 0.1%-0.5% by weight carboxylated polymer which can be used for greater nutrient uptake, and about 0.01%-0.5% parts by weight biological components, including but not limited to bacterial and/or mycorrhizal additives. The composition may also include about 0.01%-0.5% by weight of pigment, about 0.01%-0.5% by weight of clay product, including but not limited to bentonite, about 0.01%-0.5% by weight of cement product, such as Portland cement, about 0.01%-0.5% by weight of bird repellent agent, about 0.01%-0.5% by weight of thickening agents, such as guar and/or xanthum gum, and/or about 0.01%-0.5% by weight of a tackifier agent. Additionally, some embodiments may further include 0.002-0.5% by weight of a cross-linking agent.

Figure 1B:
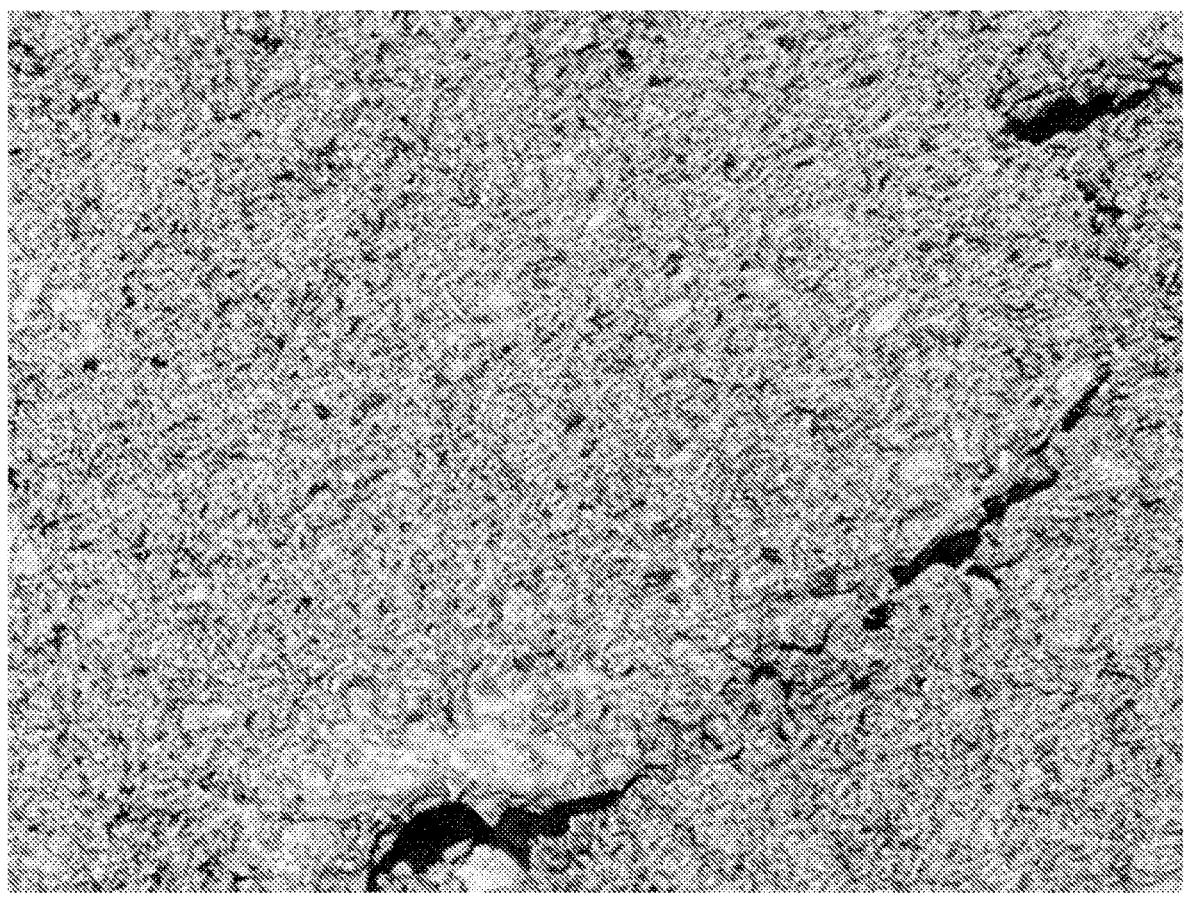
FIG. 1B is a close-up image of an exemplary embodiment of the hydromulch composition of the present disclosure immediately after application to the ground.
Figure 2:
FIG. 2 is a close-up image of an exemplary embodiment of the hydromulch composition of the present disclosure 60 days after application to the ground.
Figure 3:
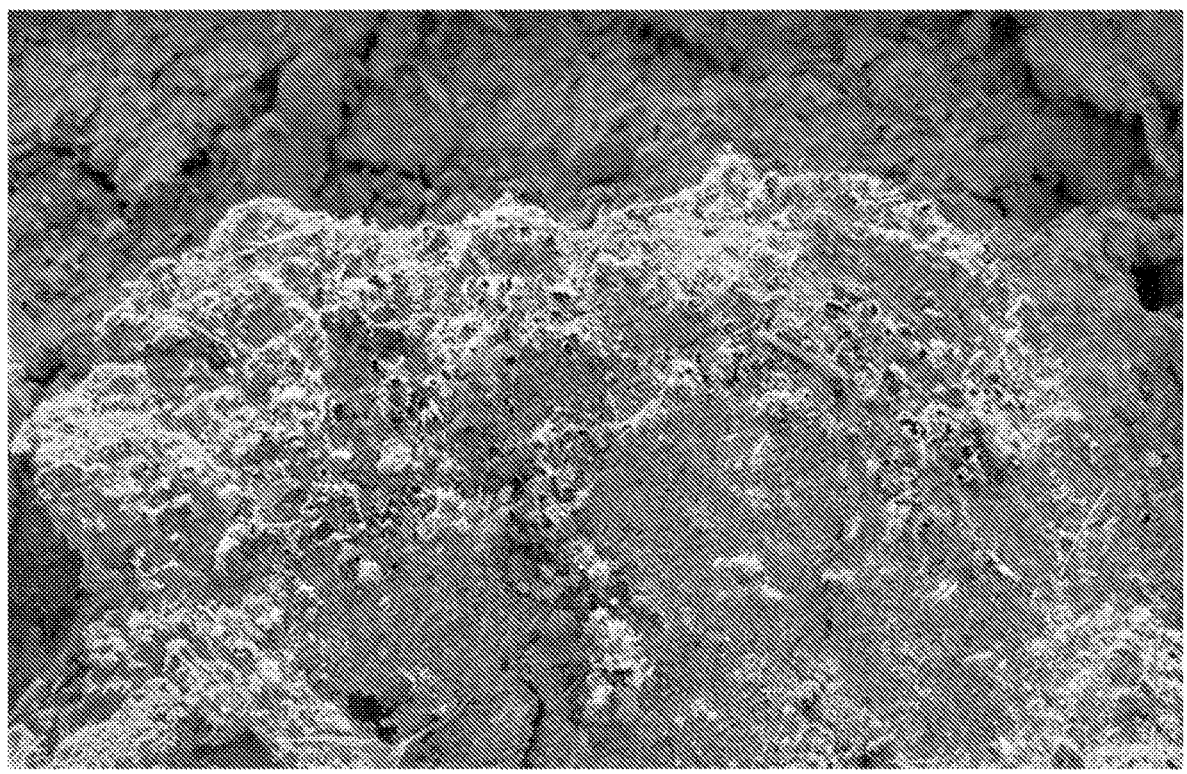
FIG. 3 is a close-up image of an exemplary embodiment of the hydromulch composition of the present disclosure 90 days after application to the ground.
Figure 4:
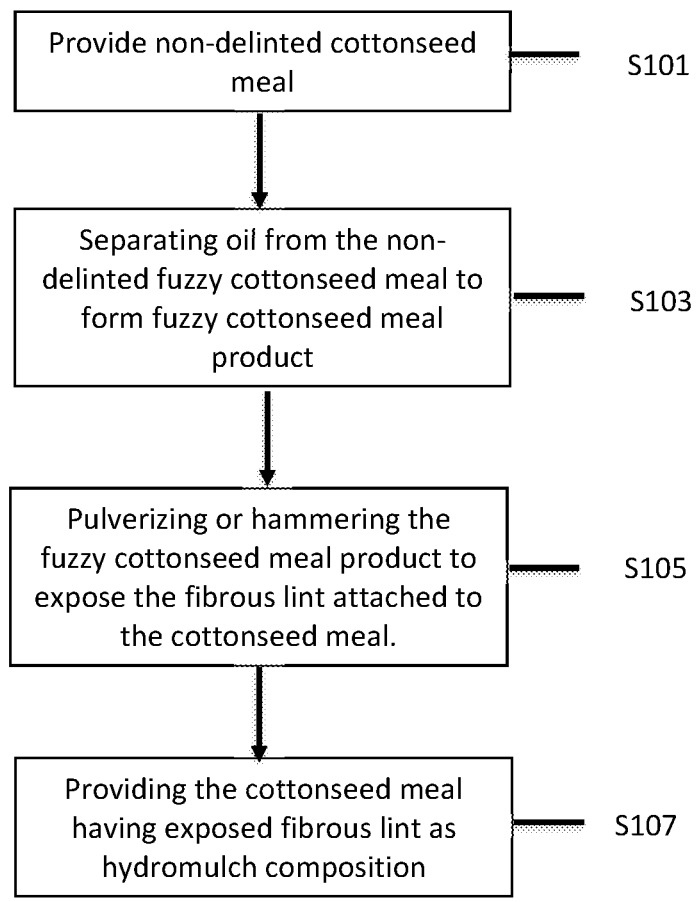
FIG. 4 is a method for producing a fuzzy cottonseed meal utilized in an exemplary embodiment of a hydromulch composition of the present disclosure.

The hydromulch composition can be applied to a target surface in order to aid in preventing erosion of the ground surface as well as assist in the growth of vegetation in the target surface. In some exemplary embodiments of the hydromulch composition can be mixed with a dispersant to form a hydromulch slurry. A dispersant can be any suitable material including but not limited to water or other liquid or aqueous composition. The hydromulch composition can be combined with water or other liquid at any suitable ratio including between about 1:5 to about 5:1, about 1:3 and 3:1, or about a 1:1 ratio of pounds of hydromulch composition to gallons of liquid or aqueous solution. In other exemplary embodiments and depending upon the additives included with an initial hydromulch composition of the present disclosure, one or more additional additives may be added at the time of mixing the hydromulch composition with a dispersant. The hydromulch composition can similarly be formed into matts or rolls that can similarly be applied to surfaces to inhibit or reduce potential erosion. In some exemplary embodiments, a vegetation seed can be applied to the treatment surface prior to the hydromulch composition being applied to the treatment surface, or alternatively, the vegetation seed can be added to the hydromulch composition itself or when forming the hydromulch slurry to be applied simultaneously with the hydromulch composition slurry. Similarly, one or more fertilizers can be added when forming the slurry. As shown in FIGS. 1-3, the hydromulch composition can cover the desired treatment area for prolonged periods of time after the initial treatment and be maintained on the surface for over 90 days in some exemplary embodiments. The hydromulch hast the ability to remain on the treatment surface allows for extended periods of time from about 30 to 120 days, or about 60 to 90 days, or at least 90 days. This allows for the soil to retain moisture and nutrients in the hydromulch composition for vegetation growth as well as aid in preventing erosion of the treatment surface, such as an embankment, hill, or other soil surface.

In some exemplary embodiments, the seed meal component of the hydromulch composition can have an initial moisture content between about 1 to 15%, or about 2 to 10% of about 3-6%. The ash content of the hydromulch composition can further include between about 10-30% or between about 15-25% or about 20%. Furthermore, the organic matter of the hydromulch composition can include between 70-90% organic matter, or between about 75-85%, or between about 80-83%. The hydromulch composition when applied to the surface of the ground directly or as mixed with an aqueous solution to form a slurry can have a percent light penetration value of between about 5-15% and a ground cover percent of about 85-95%. Similarly, the dry hydromulch composition can have a water holding capacity between about 250-350% or between about 200-300% which can allow for large amounts of water to be stored in the mulch when mixed with a liquid solution/dispersant and aid in provide moisture to the surface of the ground that is being treated with the hydromulch. Similarly, if the hydromulch composition is applied without the use of a dispersant or with a dispersant, the water retention properties allow for it to absorb rain or drainage water at a higher rate and potentially prevent the erosion for the water as well as store it for use in aiding vegetation growth.

Additionally, the hydromulch composition of the present disclosure can have a C:N ration of between about 10 parts carbon to 1 part nitrogen or about 10:1. In other exemplary embodiments, the C:N ration can be between 3:1 to about 12:1, or between about 5:1 and 10:1 or between about 3:1 and 12:1. In some exemplary embodiments, the C:N ration can be less that 12:1 or a C:N ratio lower than 10:1. By lowering the C:N ration, the hydromulch composition can reduce the need for the any vegetation to have to rely upon nutrients completely from the soil itself.

In some exemplary embodiments, the seed meal component of a hydromulch composition of the present disclosure can have a moisture content between about 2-10% or between about 4-7%, or less than 8%. The oil content of the seed meal component can be between about 5-15% or between about 8-12%, or less than 10% by weight. In other embodiments, the oil content of the fuzzy cottonseed meal component can be less than 15% by weight Furthermore, the seed meal component can have a protein content between about 15-35%, or between about 20-30%. The fiber content can be a between about 15-35%, or between about 20-30%. Similarly, the lint content of the seed meal component can by weight be between about 15-35%, or between about 20-30%, or between about 22 and 26%, or less than 26%.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A hydromulch composition comprising:
   a fuzzy cottonseed meal derived from oil-extruded non-delinted cottonseed wherein the fuzzy cottonseed meal derived from oil-extruded non-delinted cottonseed comprises between 70-99% of the hydromulch composition; and
   a homo- or copolymer based on acrylates or polymerized corn starch.

2. The hydromulch composition of claim 1, further comprising an amine-based homo or copolymer and the copolymer is polyaspartate.

3. The hydromulch composition of claim 2, further comprising a biological microorganism.

4. The hydromulch composition of claim 3, further comprising a pigment.

5. The hydromulch composition of claim 4, further comprising a clay product.

6. The hydromulch composition of claim 5, further comprising cement product.

7. The hydromulch composition of claim 6, further comprising bird repellent composition.

8. The hydromulch composition of claim 7, further comprising thickening agents.

9. The hydromulch composition of claim 8, further comprising tackifier.

10. The hydromulch composition of claim 3, wherein the biological microorganism includes either a bacteria or mycorrhizal.

11. The hydromulch composition of claim 5, wherein the clay product is bentonite.

12. The hydromulch composition of claim 6 wherein the cement product is Portland cement.

13. The hydromulch composition of claim 1, further comprising providing at least one of the following additives:
    a superabsorbent polymer (SAP),
    carboxylated polymer,
    biological components,
    pigment,
    clay product,
    cement product,
    bird repellent agent,
    thickening agents, or
    tackifier agent.

14. The hydromulch composition of claim 13, wherein fuzzy cottonseed meal derived from oil-extruded non-delinted cottonseed has an oil content less than 15% and a lint-exposed component between 20-30% by weight.

15. A hydromulch composition comprising:
    fuzzy cottonseed meal derived from oil-extruded non-delinted cottonseed, wherein the oil content of the fuzzy cottonseed meal is less than 15% and the lint-exposed component of the non-delinted cottonseed product is between 20-30%, wherein the cotton seed meal product comprises between 70-99% by weight of the hydromulch composition and further comprises and is homogenized with the following additional additives:
    0.1%-0.5% by weight of a superabsorbent polymer (SAP),
    0.1%-0.5% by weight of a carboxylated polymer,
    0.01%-0.5% by weight of a biological component,
    0.01%-0.5% by weight of a pigment,
    0.01%-0.5% by weight of a clay product,
    0.01%-0.5% by weight of a cement product,
    0.01%-0.5% by weight of a bird repellent agent,
    0.01%-0.5% by weight of a thickening agents,
    0.01%-0.5% by weight of a tackifier agent; and
    0.002-0.5% by weight of a cross-linking agent.

16. The hydromulch composition of claim 15, wherein the cross-linking agent is sodium tetraborate.

* * * * *